United States Patent [19]

Zampolin et al.

[11] Patent Number: 5,083,854
[45] Date of Patent: Jan. 28, 1992

[54] SPATIAL LIGHT MODULATOR WITH IMPROVED APERTURE RATIO

[75] Inventors: Ronald F. Zampolin; Bryan E. Loucks, both of Santa Clara County, Calif.

[73] Assignee: Greyhawk Systems, Inc., Milpitas, Calif.

[21] Appl. No.: 480,270

[22] Filed: Feb. 15, 1990

[51] Int. Cl.$^5$ .............................................. G02F 1/13
[52] U.S. Cl. ................................. 359/40; 353/122; 353/81; 353/35; 359/48; 359/53; 359/72
[58] Field of Search .................... 353/31, 38, 81, 120, 353/122, 20, 30, 35; 350/331 R, 334, 335, 342, 337, 339 F, 345, 339 R; 358/235, 236

[56] References Cited

U.S. PATENT DOCUMENTS

| | | | |
|---|---|---|---|
| 4,707,077 | 11/1987 | Marom | 350/342 |
| 4,722,593 | 2/1988 | Shimazaki | 350/331 R |
| 4,728,185 | 3/1988 | Thomas | 353/122 |
| 4,818,983 | 4/1989 | Hara et al. | 358/236 |
| 4,824,210 | 4/1989 | Shimazaki | 350/334 |
| 4,824,216 | 4/1989 | Perbet et al. | 350/339 R |
| 4,832,461 | 5/1989 | Yamagishi et al. | 350/346 |
| 4,836,652 | 6/1989 | Oishi et al. | 350/334 |
| 4,908,584 | 3/1990 | Reichman | 350/342 |
| 4,928,123 | 5/1990 | Takafuji | 353/81 |
| 4,941,735 | 7/1990 | Moddel et al. | 350/338 |

FOREIGN PATENT DOCUMENTS

| | | | |
|---|---|---|---|
| 2619937 | 3/1989 | France | 353/122 |
| 61-156222 | 7/1986 | Japan | 353/20 |
| 63-149625 | 6/1988 | Japan | 350/344 |

Primary Examiner—Rolf Hille
Assistant Examiner—Minhloan Tran
Attorney, Agent, or Firm—Flehr, Hohbach, Test, Albritton & Herbert

[57] ABSTRACT

A spatial light modulator is disclosed with a first lens array disposed adjacent to a matrix of light modulators, and in proximity to a liquid crystal light valve containing a photoconductive element. Low intensity light is collimated by a lens element to illuminate an optical aperture which has geometric configuration similar to that of the matrix element. The first lens array focuses light from the illuminated aperture into the pupil of a matrix addressed spatial light modulator element. The second lens array collects light emitting from the light modulator element, and focuses the image of the aperture onto the photoconductive element of the liquid crystal light valve so as to preserve the geometrical and positional configuration of the optical aperture, and magnify the size of the illuminated region on the photoconductor. The design of the optics is such that when adjacent apertures are imaged onto the photoconductor, the proximate boundaries of the illuminated regions are contiguous.

20 Claims, 4 Drawing Sheets

APERTURE RATIO IMPROVEMENT

SPATIAL LIGHT MODULATOR WITH IMPROVED APERTURE RATIO

BACKGROUND OF THE INVENTION

1. Field of Invention

The present invention relates to an optically addressed spatial light modulator. More specifically, the present invention relates to a spatial light modulator in which a matrix of light modulating elements is used to address a single photoaddressed liquid crystal light valve.

2. Summary of the Prior Art

Spatial light modulators consisting of a matrix of electrically addressed liquid crystal elements can be used to modulate high intensity light and with suitable optics project an image onto a screen where it may be viewed. The quality of the image is influenced by the brightness and contrast of the projected image.

The matrix of liquid crystal elements consists of an active area (region where the liquid crystal can modulate the input light), and an inactive area (region composed of electrode data lines, busbars, electrical devices and the isolation separating adjacent picture elements). The ratio of active to inactive area is defined as the aperture ratio.

As the number of pixels per unit area is increased to achieve higher resolution, the number of components in the inactive area is also increased. The process of lithography used to define the components making up the inactive area is constrained as to minimum feature size. Consequently, the inactive area will increase and the aperture ratio, picture brightness, and contrast will accordingly be reduced.

Prior art addresses the brightness problem by separating the light used to create projected images from the light transmitted through the matrix liquid crystal element. This is accomplished by modulating a low intensity light source by a matrix addressed liquid crystal light valve. The light that is thus modulated falls onto a photoaddressed liquid crystal light valve. The image of the addressing matrix is thus reproduced at the photoconductive surface. This device has been described in copending U.S. Pat. Application Ser. No. 436,447 (hereafter referred to as Haven et al.), filed on November 14, 1989, and assigned to the same assignee as the present application.

Another problem with the prior art is that the optical properties of a photoaddressed light valve are spatially modulated according to the intensity of the addressing light at each picture element. Therefore, any light falling outside defined pixel boundaries will degrade system contrast. Prior art requires expensive collimating optics together with fiber-optic substrates to provide good contrast.

An additional problem with prior art is the effect of diffracted energy outside the pixel boundaries as the pixel size in the matrix modulator becomes small (higher resolution). Since the active area in the matrix modulator defines the pixel boundaries, contrast will be degraded as resolution increases.

Additional prior art, represented by U.S. Pat. No. 4,836,652 by Oishi et al. is directed toward a similar application, that of electrographic imaging using light projected through matrix addressed liquid crystal shutters to address a photosensitive medium. In this case, light is focused by an array of lenses and directed through the matrix modulator element onto a photosensitive medium, with unwanted or diffuse light blocked by a photomask. The disadvantages of the approach outlined by Oishi et al. are (1) the glass substrates must be thin, and consequently fragile, so that light directed from the matrix element does not diffuse into adjacent elements and degrade contrast, (2) the photosensitive medium must be in close proximity to the photomask to minimize diffraction effects from the photomask and consequent loss of resolution and contrast, (3) the size of the light opaque region of the photomasks aperture must be large to satisfy the geometry constraints on the lens design. Therefore, no aperture ratio improvement can be realized.

Earlier prior art in this area relies on the use of lens array (Selfoc) disposed between the matrix modulator and the photosensitive medium, to image the matrix onto the medium. This limits the projected geometry to that of the matrix aperture itself. Therefore no aperture ratio improvement can be realized.

OBJECTIVES OF THE INVENTION

It is an objective of the present invention to provide an improved spatial light modulator with favorable aperture ratio.

It is another objective of the present invention to provide optical aperture boundaries that are independent of the addressing means.

It is another objective of the present invention to provide means to optically relay addressing means from a matrix liquid crystal device to a photoaddressed liquid crystal device.

It is another objective of the present invention to provide means to collimate light input to a matrix addressed liquid crystal light modulator so as to improve uniformity and contrast.

It is another objective of the present invention to provide a spatial light modulator whereby the focused image of the aperture in the pupil of the light modulating element is small relative to the pupil of the light modulating element.

SUMMARY OF THE INVENTION

The attainment of these and related objective may be achieved through the use of the novel spatial light modulator system herein disclosed. A spatial light modulator in accordance with this invention has a first lens array disposed adjacent to a matrix of light modulating elements, and in proximity to a liquid crystal light valve containing a photoconductive element. Low intensity light is collimated by a lens element to illuminate an optical aperture which ha geometric configuration similar to that of the matrix element. The first lens array focuses light from the illuminated aperture mask into the pupil of a matrix addressed spatial light modulator element. The second lens array collects light emitting from the matrix of light modulating elements, and focuses the image of the aperture onto the photoconductive element of the liquid crystal light valve so as to preserve the geometrical and positional configuration of the optical aperture, and magnify the size of the illuminated region on the photoconductor. The design of the optics is such that when adjacent apertures are imaged onto the photoconductor, the proximate boundaries of the illuminated regions are contiguous.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
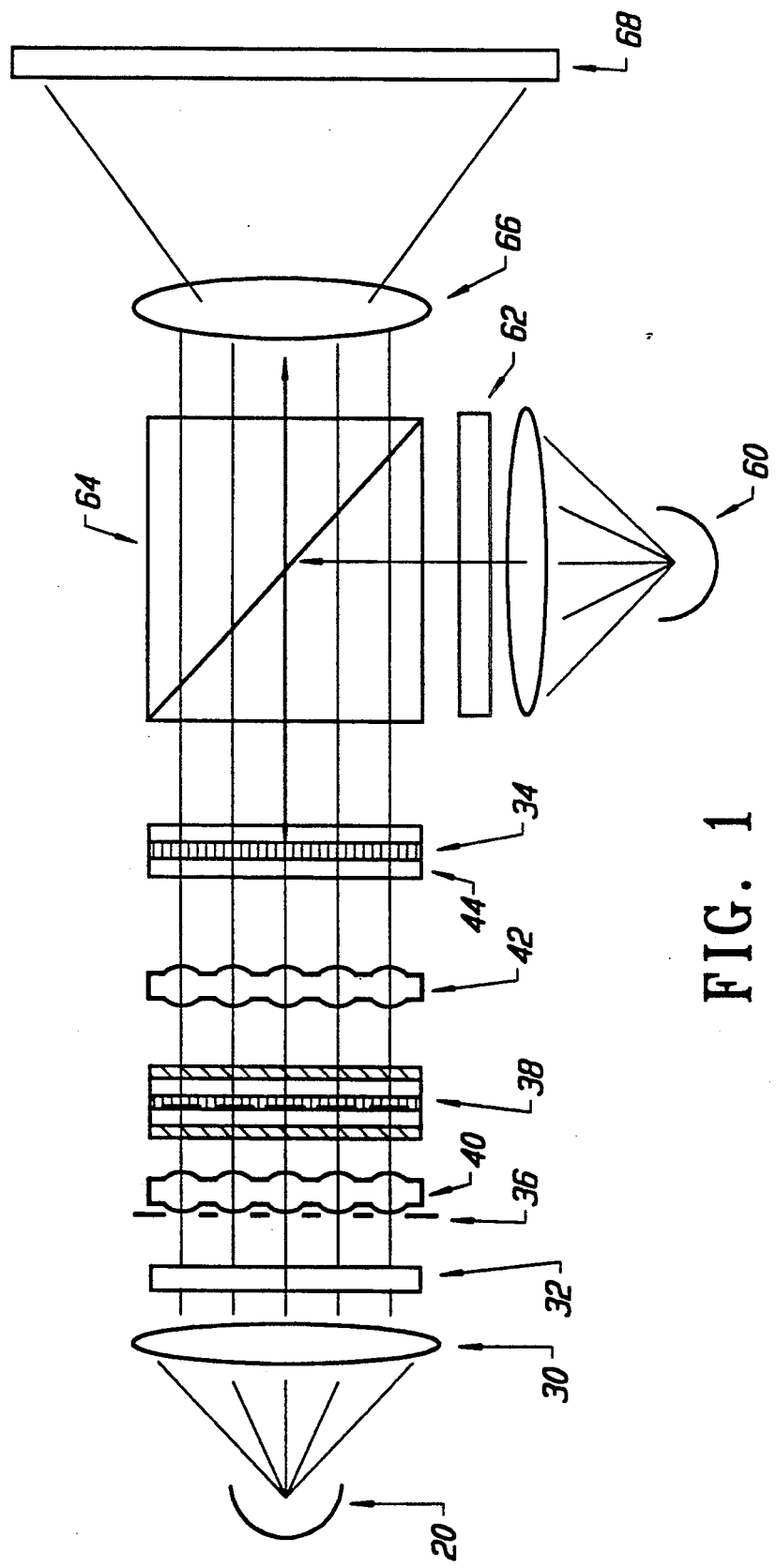
FIG. 1 is a cross section view of the preferred embodiment spatial light modulator.

Referring to FIG. 1, a cross sectional view of the spatial light modulator of the preferred embodiment is shown. A light energy source 20 such as an incandescent lamp produces low intensity light. Light rays from light energy source 20 are made substantially parallel by collimating lens 30. Collimating lens 30 is typically a molded aspheric single element lens, but lens 30 could be any combination of lenses producing well collimated light. Filter 32 is placed to receive light from collimating lens 30, and to pass wavelengths to which a photoconductor in light valve 34 has maximum sensitivity, and to absorb or reflect other wavelengths. For a photoconductor such as amorphous silicon, the range of wavelengths of maximum sensitivity is between 650 nm and 750 nm. Monochromatic light produced by filter 32 also eliminates some chromatic aberrations in the lenses, thereby increasing resolution.

The filtered, collimated light propagates through aperture mask 36 and is focused into the pupil of the matrix modulator 38 by lens array 40. In the preferred embodiment, lens array 40 is a SMILE array made by Corning Glass Works. Lens array 40 can be a gradient index (GRIN) array such as a Selfoc array made by Nippon Sheet Glass Co., an array of graded index polymers, an array of Fresnel zone plates, or an array of holographic optical elements.

Figure 4:
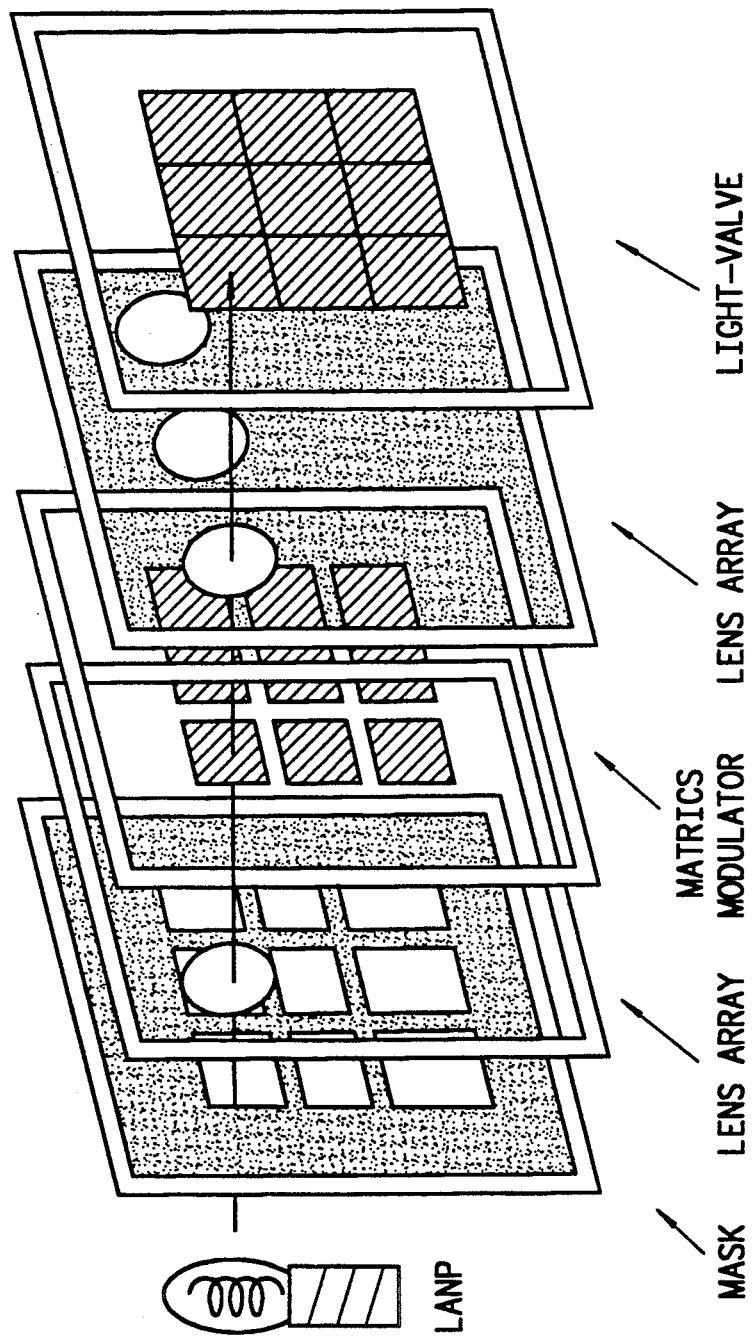
FIG. 4 is an illustrative diagram of the improved aperture ratio.

The focused light is amplitude modulated by the matrix modulator 38. In the preferred embodiment, matrix modulator 38 is a thin film transistor (TFT) addressed liquid crystal light valve. The matrix modulator could be any transmissive matrix addressed light valve. A lens array 42, similar in construction to lens array 40, collects light from the matrix modulator 38 and relays it to the photoconductive surface 44 of light valve 34. Lens array 42 is typically an imaging lens with 2:1 conjugates, and thus a magnification of 2:1. Thus the illuminated image of the aperture mask 36 is magnified at the photoconductor 44. The magnification and focal length can be chosen such that when the aperture is rectangular, the proximate boundaries of adjacent elements are contiguous, or slightly overlapping, to produce a tiled effect, as shown in FIG. 4. For circular or hexagonal apertures, the effect is a close packed hexagonal array. A slight overlap may be desirable because it corrects for possible lens defects which would shift placement of the imaged aperture.

Figure 2:
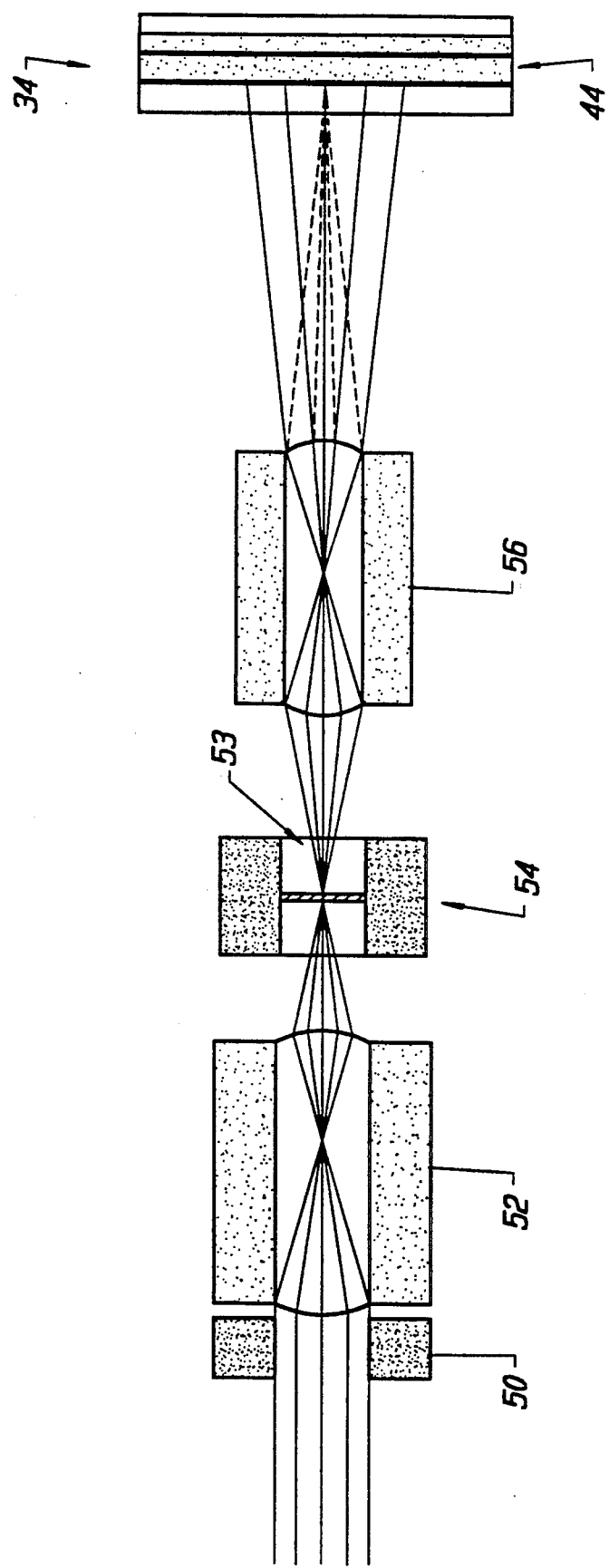
FIG. 2 is an enlarged schematic view of the addressing optics.

Referring to FIG. 2, a representative design of a single element of the spatial light modulator is shown for analysis. FIG. 2 is one example of a design which produces the desired result, and other designs, particularly of light paths, are possible. Collimated light passes through the aperture 50 in aperture mask 36 which defines the object to be imaged onto the photoconductor 44. The size of the aperture should be approximately equal to that of the matrix modulator to maximize transmitted intensity. The light is collected by a lenslet 52 which brings the light to a focus at the pupil 53 of the light modulating element 54. An example of an appropriate lenslet 52 would have an effective focal length of approximately 2.0 mm and be operated at an f/# of typically 25 and would focus the light approximately 1.6 mm to the right of the lenslet 52. A goal with lenslet 52 would be to minimize the f/#, hence producing a smaller focused spot, by reducing the focal length. The ray bundle emerging from light modulating element 54 should fill the entire lenslet 56, thereby increasing the effective beam diameter and reducing diffraction effects. The lenslet 56 operates at about 2:1 conjugate and hence magnifies the image to produce some overlap of images at the photoconductor 44. An appropriate imaging lenlet 56 would have an effective focal length of 4.2 mm and be operated at an f/# of 50.

The focused image of the aperture 50 is substantially smaller than the pupil 53 of the light modulating element 54. In the constructed device, approximately 95% of the energy in the diffracted light is within a 32.5 um spot in the focal plane. This allows a greater margin for misalignment for low resolution modulators with large apertures, and less demands on maintaining intrinsically large aperture ratio during the process of manufacturing high resolution matrix light modulators.

Figure 3A:
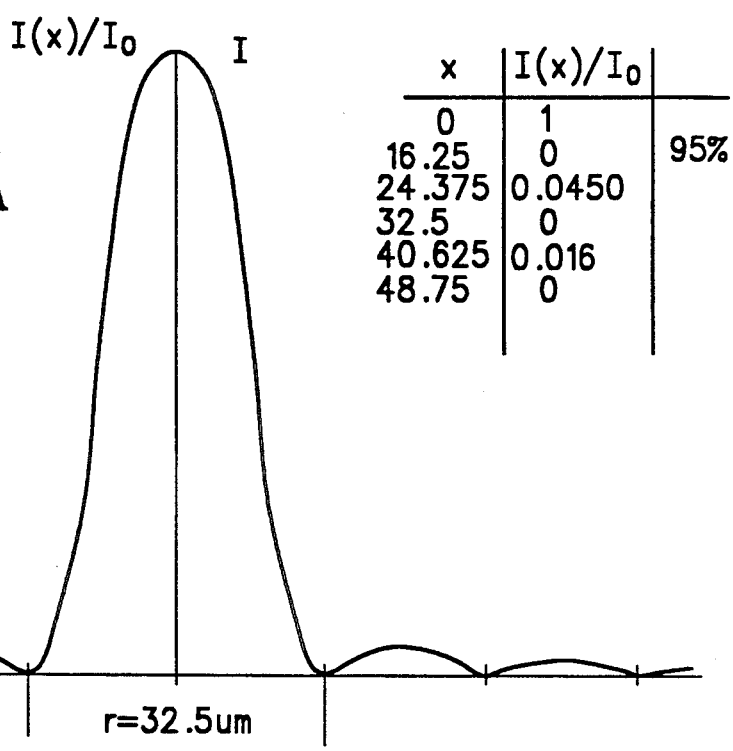
FIG. 3A is an illustrative diagram of the energy distribution at a light modulating element.
Figure 3B:
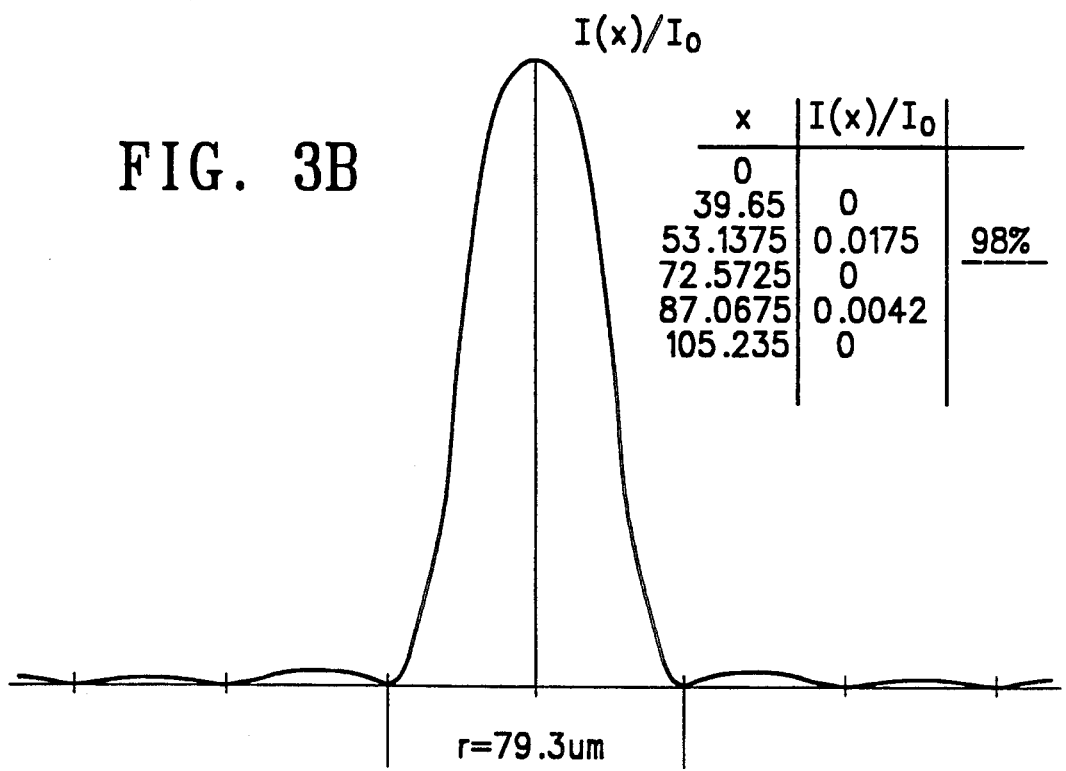
FIG. 3B is a illustrative diagram of the energy distribution at a pixel in the photoconductor plate.

Using the preliminary design presented herein, diffraction analysis can be done based on the f/# numbers of lenslets 52 and 56 to yield intensity distributions as a function of diffracted spot size at the light modulating element 54 and the photoconductor 44. Diffraction occurs at both the square aperture 50 and the second lenslet 56. Since these apertures are both symmetric, the intensity distribution can be viewed in one dimension and translated into the other. Fraunhoffer diffraction produced by a square aperture yields an intensity distribution I(x) in the focal plane of a lens described by:

$$I(x) = I(O)[2f \cdot sin(dxk/2f)/dxk]^2$$

where x is the linear distance in the focal plane, d is the lens diameter, f is the focal length of the lens, k is the wavenumber of the light, and I(0) is the input intensity of light. FIG. 3A depicts the intensity distribution at the matrix light modulator 54 versus the spot radius. Approximately 95% of the energy entering the square aperture is focused into the light modulating element. This spot size, approximately 32.5 um, provides a good margin for alignment error. Fraunhoffer diffraction also occurs at the second lenslet 56. The intensity distribution I(x) at the photoconductor 44 is given by the equation:

$$I(x) = I(0)[4F \cdot J_1(2kx/F)/2kx]^2$$

where $J_1(S)$ is the first order Bessel function, F is the f/# number of the lens, x is the linear distance in the focal plane, and k is the wavenumber of the light. FIG. 3B depicts the intensity distribution at the photoconductor versus spot radius. Approximately 98% of the energy transmitted through the lenslet 52 reaches the photoconductor 44. Consequently, of the energy transmitted through the aperture 50, approximately 93% reaches the photoconductor 44.

The distribution of light energy at the photoconductor determines the degree of modulation within the optically activated light valve. This effect is well described in the literature, and specifically in Haven et al. Therefore, in order to achieve high contrast of the activated pixels defined by the projected image of the optical aperture, no diffracted energy should occur outside the pixel boundary. FIG. 3B indicates that 98% of the diffracted energy occurs within a 79.3 μm spot. Therefore, the maximum possible resolution at 100% aperture ratio for this spatial light modulator design is 6.3 line pairs per millimeter.

Referring to FIG. 1, high intensity light from lamp 60 is filtered to desired color by filter 62, polarized by polarizing beam splitter 64 and directed to the reflective surface of light valve 34. Where an illuminated image is defined on the photoconductor 44, the polarization of the high intensity light is rotated and transmitted through the polarizing beam splitter 64, appropriate optics 66, and onto viewing screen 68. This process is well described in Haven et al.

The image thus produced will have maximum brightness due to the 100% aperture ratio and will have high contrast due to containment within pixel boundaries of the light energy diffracted from apertures.

The foregoing descriptions of specific embodiments of the present invention have been presented for purposes of illustration and description. The are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A spatial light modulator system, comprising:
   light source means;
   filter means for selecting light of specified wavelengths from said light source means;
   collimating means placed between said filter means and said light source means for making light from said light source means substantially parallel;
   aperture mask means placed to intercept collimated and filtered light;
   a first plurality of lens elements placed for focusing light transmitted through said aperture mask means;
   a plurality of light valve elements placed to amplitude modulate light from said first plurality of lens elements;
   photoaddressed light valve means to receive light from said plurality of light valve elements; and
   a second plurality of lens elements placed between said plurality of light valve elements and said photoaddressed light valve means to relay light from said plurality of light valve elements means to said photoaddressed light valve.

2. The system of claim 1 wherein said photoaddressed light valve means is a reflection mode photoaddressed liquid crystal light valve.

3. The system of claim 1 wherein said aperture mask means is a mask with a plurality of apertures.

4. The system of claim 3 wherein said plurality of apertures are rectangular and form a rectangular pattern on said mask.

5. The system of claim 3 wherein said plurality of apertures are hexagonal and form a hexagonal pattern on said mask.

6. The system of claim 3 wherein said plurality of apertures are circular and form a hexagonal pattern on said mask.

7. The system of claim 1 wherein said plurality of light valve elements are formed by a matrix addressed light valve.

8. The system of claim 1 wherein each one of said plurality of light valve elements has a pupil, said first plurality of lens elements focusing light transmitted through said aperture mask to focal points in the pupils of said plurality of light valve elements, said focal points being substantially smaller than the pupils of said plurality of light valve elements.

9. The system of claim 1 wherein said second plurality of lens elements relay and magnify aperture images in order to project images with approximately contiguous boundaries onto said photoaddressed light valve.

10. The system of claim 9 wherein said second plurality of lens elements have magnifying conjugates.

11. The system of claim 1 wherein said collimating means is one of the following: a SMILE array, a GRIN array, or a Selfoc array, or another array of microlenses.

12. The system of claim 1 wherein said first plurality of lens elements and said second plurality of lens elements are each one of the following: a SMILE array, a GRIN array, a Selfoc array, or another array of microlenses, fresnel zoneplates, or holographic optical elements.

13. A method for providing a spatial light modulator with high aperture ratio, comprising the steps of:
   collimating light from an illumination source to produce a collimated light beam;
   projecting said collimated light beam through a plurality of apertures in an aperture mask to produce a plurality of light beams;
   focusing plurality of light beams through a plurality of transmissive light modulating elements to produce a plurality of modulated light beams; and
   projecting and magnifying said plurality of modulated light beams onto a photoaddressed light valve having a photoconductor layer to illuminate a plurality of different regions on said photoconductor layer so that the boundaries of adjacent regions are approximately contiguous.

14. A spatial light modulator system, comprising:
   (a) a source of light;
   (b) a plurality of transmissive light modulating elements positioned in a planar array and spaced apart from said source of light;
   (c) means for receiving light from said source and for individually focusing light from said source through a spot in each of said transmissive light modulating elements, each of said spots being smaller than said elements; and
   (d) a photoaddressed light valve having a photoconductive surface positioned to receive light that has passed through each of said transmissive light modulating elements 15. A system according to claim 14 further comprising lens means optically disposed between said plurality of transmissive light modulating elements and said light valve for projecting the light that has passed through each of said light modulating elements onto a different region of the photoconductive surface.

16. A system according to claim 15 wherein said lens means magnifies and projects the light that has passed through each of said light modulating elements onto said photoconductive surface so that adjacent regions on said surface are approximately contiguous with one another.

17. The system of claim 14 wherein said means for focusing light focuses the light from the source in the plane of the plurality of light modulating elements.

18. A matrix addressed light valve device for modulating a projection beam, said device comprising:
(a) an illumination source;
() a matrix addressed displlay means positioned to receive light from said illumination source, said display means having a plurality of light modulating elements in a planar array for producing a spatial light pattern formed of a plurality of addressing light beams;
(c) a photoaddressed liquid crystal light valve for receiving each of said plurality of light beams from said display means in a different region, and for modulating said projection light in accordance with said light pattern; and
(d) a first plurality of lenses positioned in a planar array in the optical path of said plurality of light beams for magnifying and projecting said plurality of light beams onto the light valve.

19. The system of claim 18 wherein said first plurality of lenses magnifies said light beams so that adjacent regions are approximately contiguous with one another.

20. The system of claim 18 further comprising a second plurality of lenses to focus light from the illumination source into and through each one of said plurality of light modulating elements.

* * * * *